Oct. 17, 1944.                T. R. SMITH                2,360,731
                            WEDGE-RING SEAL
                         Filed Aug. 15, 1942
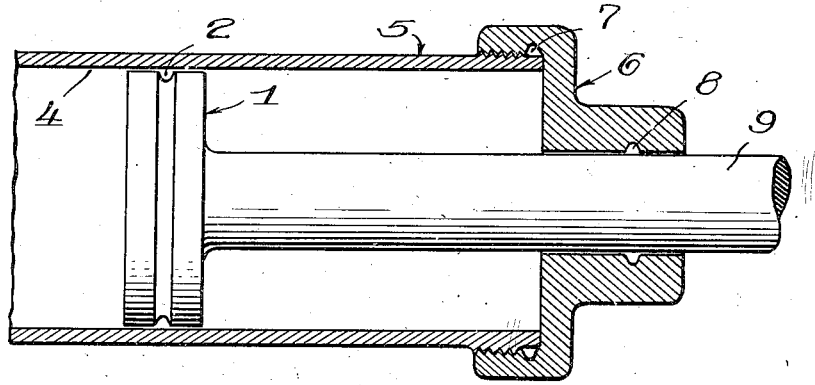
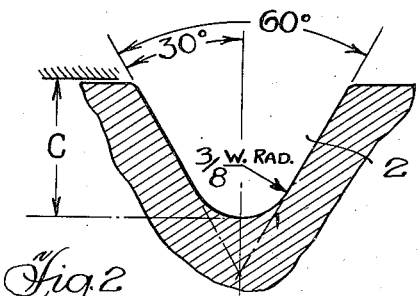
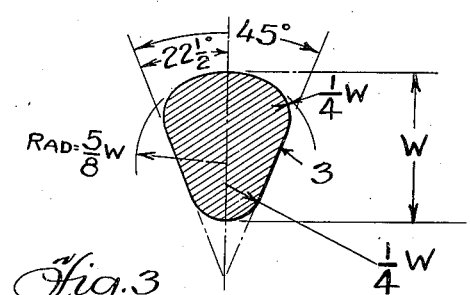
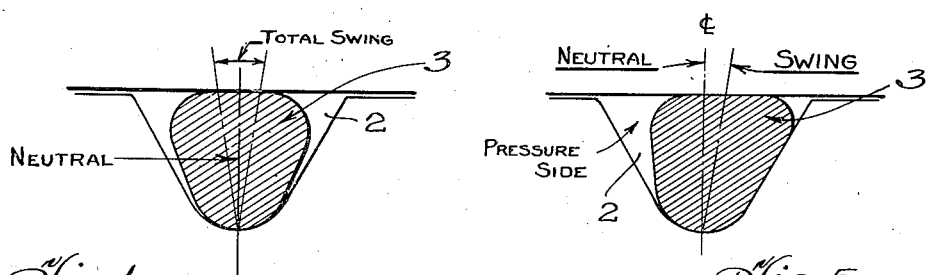
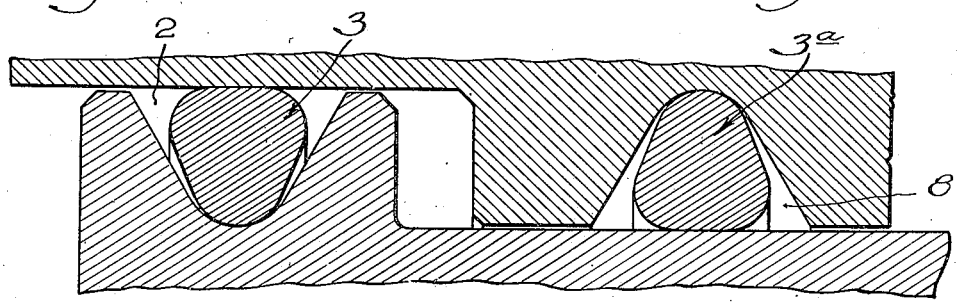

Patented Oct. 17, 1944

2,360,731

UNITED STATES PATENT OFFICE 2,360,731

WEDGE-RING SEAL

Thomas R. Smith, Newton, Iowa, assignor to The Maytag Company, Newton, Iowa, a corporation of Delaware Application August 15, 1942, Serial No. 454,885

5 Claims. (Cl. 286—26)

The present invention relates to a novel construction of seal including a resilient sealing element or packing operating in a groove. This novel type of seal is especially effective for sealing fluids under pressure between relatively movable surfaces, or between surfaces that are maintained stationary.

The invention comprehends a novel seal comprising a resilient packing of predetermined shape and cross section operating in a groove of predetermined shape and dimensions, the parts being so related and combined that most effective sealing under all conditions encountered in use, is accomplished. The resilient packing is substantially wedge-shaped and adapted to seat in a substantially V-shaped groove, with the angle of the groove somewhat greater than the angle of the sealing element or packing to permit the seal to pivot around the radius of its vertex and thereby slip or pivot from one side of the V-shaped groove to the other. The top edge of the sealing element or packing is formed on a radius of such dimension that approximately the same amount of squeeze or compression is maintained as this element or packing slips from one side of the groove to the other.

The present novel seal is equally applicable as an internal or external type seal. Either type of seal is effective for sealing under relatively low or high pressures, or under no pressure, so that they have universal application and are particularly adapted for the hydraulic field.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

In the drawing:

Figure 1 is a fragmentary view in vertical cross section through a cylinder and head or end cap, with the reciprocating piston head and cylinder head formed with grooves for the reception of the novel wedge type seal.

Figure 2 is a fragmentary enlarged view in vertical cross section through the piston head to show more clearly the arrangement and dimensions of the seal groove.

Figure 3 is an enlarged view in vertical cross section through the wedge seal and giving the dimensions thereof.

Figure 4 is a fragmentary enlarged view in vertical cross section through a portion of the cylinder and piston head and showing the position of the wedge seal in the groove when in neutral position.

Figure 5 is a view similar to Figure 4 but showing the position of the wedge seal under working pressure conditions.

Figure 6 is an enlarged fragmentary view in vertical cross section through the cylinder wall and piston, with the piston carrying an internal type of wedge seal and the cylinder an external type of wedge seal.

Referring more particularly to the disclosure in the drawing, the novel wedge seal is illustrated as applied to a cylinder and piston in which the piston 1 is provided with a peripheral groove 2 of substantially V-shape and adapted to receive a wedge-shaped, resilient sealing element 3 for sealing the space between the piston 1 and the wall 4 of the cylinder 5. The cylinder head or cap 6 is also provided with V-shaped grooves 7 and 8 for the reception of a pair of external type wedge-shaped sealing elements 3ª, the wedge-shaped sealing element in the groove 7 being held in fixed relation for sealing the space between the head and the cylinder wall, and the wedge-shaped sealing element in the groove 8 sealing the space between the head 6 and the reciprocating piston rod 9. It is to be noted that the wedge-shaped sealing element 3 in the groove 2 is of the internal type in which the wedge is tapered inwardly while that in the grooves 7 and 8 is of the external type in which the taper of the wedge is outwardly. This latter form is preferably used in packing glands and the like.

The cross section of the wedge-type sealing element and the dimensions of the substantially V-shaped grooves in which this seal is carried are outlined in detail in the drawing, particularly in Figures 2 and 3. As therein shown, the angle made by the V-shaped groove is approximately 60°, while that made by the side walls of the sealing element is approximately 45°, so that the angle of the V-shaped groove is greater than the angle of the wedge-type sealing element to permit this sealing element to slip or pivot from one side of the V-shaped groove to the other, pivoting around the radius at its vertex. The top edge of the wedge-type sealing element is also curved in a manner such as to maintain the same amount of squeeze or compression as the sealing element slips from one side of the groove to the other. The vertex of the sealing element has a radius preferably slightly less than but approximately conforming to the radius at the bottom of the V-shaped groove in which it pivots. Also the other two corners of the sealing element are so formed and at a proper radius such as to prevent these corners from being caught or pinched at the sealing edges.

The present novel seal or packing is effective for sealing pressures of fluid between surfaces which may be relatively movable or stationary, and although it is shown in the contour of a ring, it is to be understood that it may be formed of any desired contour or configuration in conformity with the contour of the parts to be sealed. Furthermore, although the invention is illustrated in a hydraulic cylinder, it has a universal application. For example, the seal may in addition to being applied between a piston and cylinder or between a piston rod and gland bearing be mounted on a pivot bolt where the relative motion between coacting parts is rotary rather than reciprocating. Or it may be applied as a static seal such as a plug in the end of a pipe or a cap on the end of a cylinder, where there is no relative motion, and in numerous other applications which will become apparent. Or, it may form a most effective gasket between a gear case and cover plate by inserting the sealing element in a groove in a gasket surface and bolting down the cover plate upon the seal The novel seal is highly applicable to sealing parts in hydraulic equipment, and it is to be noted that the action of the seal is not necessarily the same under all conditions. For example, in a piston where the pressure changes from one side of the piston to the other, the sealing element will pivot first from one side of the groove to the opposite side. Where it is used as a static seal such as on the end cap or head of a cylinder as shown in Figure 1, the pressure will generally be on but one side.

It is important to note that in a resilient type of sealing element or packing, the present sealing element or packing being preferably of a natural rubber compound or of a compounded synthetic rubber suitable for the purpose, that it pass from one phase of operation into another as the pressure changes from a relatively low pressure to a relatively high pressure. Thus, in the ordinary operation of a resilient or flexible type sealing element operating in a groove in the manner here disclosed, the seal passes through three phases of operation. First, the no-pressure phase; second, the relatively low pressure phase; and third, the relatively high pressure phase.

In the no-pressure phase of operation, sealing is maintained by the elastic quality of the material alone, and is directly related to the initial squeeze or compression of the cross section of the packing, with the shape of the cross section having an effect upon the degree of flexibility obtained. With the proper wedge-shaped type of packing, operating in a substantially V-shaped grove, this packing has a greater range of flexibility, without building up too high a pressure, than is obtained with other types of packing.

In the low pressure phase of operation, the pressure acting against one side of the packing forces the packing against the sides of the V-shaped groove, with the packing acting as a fairly rigid body and therefore tending to force down the angle of the side of the V-shaped groove. This causes the packing to be expanded and forced against the sealing surface. In the ilustrative embodiment shown in Figure 1, the surface to be sealed in the case of a piston and cylinder is the cylinder wall. This adds sealing pressure to the packing without a substantial amount of distortion and which is an advantage because low pressures are not generally sufficient to distort the packing material enough to obtain good sealing.

In the high pressure phase of operation, the resilient packing tends to act as a fluid and flows into the corner formed by the sides of the V-shaped groove and the surface to be sealed, and thereby resulting in a most effective seal at high pressure. With the wedge-type packing and the substantially V-shaped groove of the present invention, an acute angle is formed between the side of the groove and the surface being sealed so that the packing material builds up more resistance to extrusion into this opening. This contributes to the ability of the present invention to withstand higher pressures and give longer life than in prior types of seals including those in which a resilient packing is mounted in grooves in which the sides thereof are disposed at right angles to the sealing surface. In this latter type of construction, high pressures tend to extrude the resilient packing material into the opening between the surfaces being sealed and thereby cutting or mutilating and destroying the sealing surfaces of the packing.

In the operation of the present seal on a piston, where the pressure changes from one side of the piston to the other, the oil pressure first forces the sealing element from one side of the V-shaped groove to the opposite side, in a pivoting action. Then as the pressure builds up, the packing wedge is forced into the acute angle formed between the cylinder wall and the side of the V-shaped groove. The opposite action takes place when the pressure is reversed to the opposite side of the piston. As the piston works back and forth and under pressure, the sealing element or packing pivots from one side of the groove to the other around its vertex. There is no rolling action. The operation of pivoting back and forth exposes more wearing surface on the packing material and also assists very materially in the lubrication of the seal. A seal which operates back and forth with the same sealing surface rubbing against the piston wall, has little chance for good lubrication and long life. The pivoting action, therefore, is highly important and an outstanding feature. Another outstanding feature is the expanding action, or in the case of the external type seal, the compressing action, which results due to the sealing member acting as a semi-rigid body and tending to slide down the side of the V-shaped groove.

I claim:

1. A seal for sealing the space between adjacent parts such as a cylinder and a piston adapted to be reciprocated by hydraulic fluid transmitted under pressure to the opposite ends of the cylinder, comprising a substantially V-shaped recess in one of the parts opening toward the other part and having its opposite sides disposed at an acute angle and a resilient sealing element of substantially wedge-shape under compression and working pressure conditions carried in the recess, the sealing element having a sealing face in wiping contact with the other part and its opposite sides disposed at an acute angle substantially less than the angle formed by the sides of the recess in which it is carried, the bottom of the recess and the vertex of the sealing element being curved on approximately the same radius of curvature whereby with the vertex seated in the bottom of the recess, the sealing element is permitted to pivot about its vertex within the recess in accordance with the pressure applied to one side of the sealing element and cause one side of this element to engage the adjacent side of the recess with the sealing face maintained in effective sealing contact under all conditions of pressure and temperature to which the seal is subjected in use.

2. A seal for sealing the space between adjacent parts such as a cylinder and a piston adapted to be reciprocated by hydraulic fluid transmitted under pressure to the opposite ends of the cylinder, comprising a substantially V-shaped recess in one of the parts opening toward the other part and a resilient sealing element under radial compression carried in the recess, the sealing element being of substantially wedge-shape under working pressure conditions and having a sealing face of rounded contour, the bottom of the recess and the vertex of the sealing element having substantially the same rounded contour but with the sides of the recess being disposed at an angle greater than the angle formed by the sides of the sealing element to thereby permit limited pivotal movement of the sealing element with its vertex seated in the bottom of the recess, and with the sealing face presenting a different surface area as the seal pivots about its vertex.

3. A seal for sealing the space between relatively movable parts, comprising a substantially V-shaped recess in one of the parts opening toward the other part and having its opposite sides disposed at an angle of approximately 55° to 65°, and a substantially wedge-shaped resilient sealing ring of greater radial extent than the depth of the recess positioned in the recess and having its opposite sides disposed at an angle of approximately 40° to 50° whereby when the vertex of the sealing ring is seated in the bottom of the recess, the sealing ring may pivot about its vertex within the recess in the direction of applied pressure.

4. A seal for sealing the space between relatively movable parts, comprising a substantially V-shaped recess in one of the parts opening toward the other part and having its opposite sides disposed at an angle of approximately 55° to 65° and with the bottom of the recess curved, and a substantially wedge-shaped resilient sealing ring positioned in the recess with its vertex engaging the bottom of the recess and having its opposite sides disposed at an angle of approximately 40° to 50° and its vertex curved on a radius substantially conforming to the radius of curvature of the bottom of the recess, the sides of the sealing ring being normally spaced from the sides of the recess when in operative position whereby the sealing ring may pivot sidewise in either direction about its vertex in the direction of applied pressure.

5. A seal for sealing the space between concentric parts, comprising a substantially V-shaped groove in one of the parts opening toward the other part and having its opposite sides disposed at an acute angle, the bottom of the groove being rounded and the sides extending in diverging straight lines from the bottom of the groove and making an acute angle with the surface of the other part, a substantially wedge-shaped resilient sealing ring having a curved sealing face extending beyond the confines of the recess for sealing contact with the other part and a vertex seated on and rounded in approximate conformity with the bottom of the groove, the opposite sides of the sealing ring being disposed at an acute angle and extending in diverging straight lines throughout the greater portion of their length, the angle formed by the sides of the sealing ring being less than the angle formed by the sides of the recess to provide a spacing between the sides of the groove and the sealing ring when in operative position whereby the sealing ring is free to pivot about its vertex within the groove.

THOMAS R. SMITH.